United States Patent [19]

Raynor

[11] Patent Number: 4,684,348

[45] Date of Patent: Aug. 4, 1987

[54] COMMUNICATIONS PROCESS AND APPARATUS

[76] Inventor: Grace M. Raynor, 24365 San Fernando Rd, #157, Newhall, Calif. 91321

[21] Appl. No.: 818,124

[22] Filed: Jan. 9, 1986

[51] Int. Cl.⁴ .............................................. G09B 17/00
[52] U.S. Cl. .................................................... 434/156
[58] Field of Search .............. 434/156, 158, 167, 169, 434/178, 185; 400/91, 92, 94, 95, 482; 283/45, 46

[56] References Cited

U.S. PATENT DOCUMENTS 3,367,045 2/1968 Mendez ................................ 434/185

Primary Examiner—William H. Grieb
Attorney, Agent, or Firm—Arnold, White & Durkee

[57] ABSTRACT

A communications apparatus and process, particularly formulated to eliminate orthographic inconsistencies in a language, which thereby facilitates communication in the language. The process is particularly useful in teaching English as a second language and in overcoming illiteracy. The process uses symbolic logic to define representations for the verbalized or phonetic components of a non-numeric message. The representations can take the form of either numeric or alpha-like characters. In a preferred form, a twelve key keypad is proposed with ten numeric keys, a spacer key, and a position designation key. Using such a keypad, a one or two digit number is entered, each number being representative of a particular verbalized component of a message.

25 Claims, 3 Drawing Figures

*200*

| | + @ ¢ © TM ! : " [ ] — / | | | | | | | | | | |
|---|---|---|---|---|---|---|---|---|---|---|---|
| | # % $ & * ? ; ' ( ) – \| | | | | | | | | | | |
| | 1 | 2 | 3 | 4 | 5 | 6 | 7 | 8 | 9 | 10 | • |
| | Y | I | E | A | Ə | O | U | W | L | R | • |
| | 11 | 12 | 13 | 14 | 15 | 16 | 17 | 18 | 19 | 20 | 21 |
| UPR | M | N | Ŋ | G | K | D | T | B | P | V | F |
| | 22 | 23 | 24 | 25 | 26 | 27 | 28 | 29 | 30 | , | |
| LUWR | ħ | ħ | Z | S | J | ß | W | H | \ | , | |

Fig. 1

| 1 1 | 2 2 | 3 3 |
|---|---|---|
| 4 4 | 5 5 | 6 6 |
| 7 7 | 8 8 | 9 9 |
| * UPR | 0 0 | # \ |

Fig. 2 200

| + # | @ % | ¢ $ | © & | TM * | ! ? | : ; | " ' | [ ( | ] ) | — - | / \| |
|---|---|---|---|---|---|---|---|---|---|---|---|
| 1 Y | 2 I | 3 E | 4 A | 5 Θ | 6 O | 7 U | 8 W | 9 L | 10 R | . : | |

| | 11 M | 12 N | 13 Ŋ | 14 G | 15 K | 16 D | 17 T | 18 B | 19 P | 20 V | 21 F |
|---|---|---|---|---|---|---|---|---|---|---|---|
| UPR | | | | | | | | | | | |

| | 22 ħ | 23 ħ | 24 Z | 25 S | 26 J | 27 ʒ | 28 Ŵ | 29 H | 30 \ | , , | |
|---|---|---|---|---|---|---|---|---|---|---|---|
| LUWR | | | | | | | | | | | |

Fig. 3 300

| + # | @ % | ¢ $ | © & | TM * | ! ? | : ; | " ' | [ ( | ] ) | — - | / \| |
|---|---|---|---|---|---|---|---|---|---|---|---|
| Y Y | I I | E E | A A | Θ Θ | O O | U U | W W | L L | R R | . : | |

| | M M | N N | Ŋ Ŋ | G G | K K | D D | T T | B B | P P | V V | F F |
|---|---|---|---|---|---|---|---|---|---|---|---|
| UPR | | | | | | | | | | | |

| | ħ ħ | ħ ħ | Z Z | S S | J J | ʒ ʒ | Ŵ Ŵ | H H | \ \ | , , | |
|---|---|---|---|---|---|---|---|---|---|---|---|
| LUWR | | | | | | | | | | | |

COMMUNICATIONS PROCESS AND APPARATUS

BACKGROUND OF THE INVENTION

1. Field of the Invention

This invention relates to a communications process developed to eliminate the orthographic inconsistencies in standard language useage. This process has been applied to the English language and used in the development of a communications apparatus.

2. Description of the Related Art

The orthographic process in practically any language is inadequate and inefficient in a number of respects. The orthographics of the English language is particularly deficient in its use of several alphabetic characters to represent a single phonetic verbalized component, its use of verbalized components which are not adequately represented by alphabetic characters, and by its non-strategic placement of the phonetic verbalized components of a particular word. A major short-coming in the standard English orthographic process is that it is not governed by the laws of symbolic logic. Thus, the standard orthographic process of the English language is governed more by tradition than by logic.

The deficiencies in the standard English orthographic process are manifested in many ways. For example, English is one of the most difficult languages to learn to speak and to write. This is understandable when one considers the illogical placement, surplusage, or inadequacy of many alphabetic characters within a particular word. Such deficiencies have led to wide-spread illiteracy because of the difficulties in learning English as a primary or a second language.

A further difficulty in the standard English orthographic process that has become apparent is electronically communicating alphabetic characters. While Arabic numerals are readily digitalized and transmitted, alpha or verbalized communication has proven difficult. Because of the inefficiencies of the English orthographic process, alpha communications is particularly inefficient and is often confusing to the recipient of the message.

The deficiencies of the standard orthographic process are self-evident. For example, the standard English orthographic process has insufficient characters necessary for the representation of isolated phonetic components within many words. That is, there are many verbalized components in the English language which are not represented by indnividual alphabetic characterization under the standard English orthographic process. Examples of words where verbalized components are not adequately represented include "sing, either, vision, fashion, push, butcher, and chief."

Another deficiency in the standard English orthographic process is the impractical representation of many verbalized components. This results where alphabetic characters have been established and are generally accepted as representative of a particular verbalized phonetic component, but in certain words are substituted as representative of a different phonetic verbalized component. Thus, for many verbalized components a "standard" alphabetic representation is used giving rise to a standard pronunciation for such an alphabetic representation. However, in many uses, the alphabetic representation is indicative of another verbalized component, giving rise to a general rule of pronunciation riddled with complicated exceptions.

Still another deficiency in the standard English orthographic process is the inefficient use of alphabetic characters as representative of a verbalized phonetic component. Thus, many characters used in the English language are superfluous and have no orthographic significance. These superfluous alphabetic characters might be duplicate characters (such as "accord, green, lilly, floor, miss, etc.") or non-functional (e.g. "ghost, knife, mnemonic, pneumonia, song, sigh, etc."). Further superfluous characterization is evident in words where characters not recognized in pronunciation are used and purported to be of significance in pronunciation. These various specific character combinations are pronounced as single characters (e.g., "age, gage, great, quail, whale, waste, etc.") or ("machine, laugh, quack, etc.").

SUMMARY OF THE INVENTION

The orthographic process of the present invention has been devised to solve many of the deficiencies in the standard English orthographic process. The orthographic process of the present invention (sometimes referred to herein as the "Alphanumeric" process) has many practical uses as a substitute for the standard English orthographic process, such as teaching the English language to eliminate illiteracy or teaching English as a second language. A primary practical use of the orthographic process of the present invention is the communications apparatus for electronically communicating using the orthographic process hereof.

The communications apparatus of the present invention utilizes the Alphanumeric process of the present invention to efficiently communicate a verbalizable message. Broadly speaking, the communications apparatus hereof includes a keyboard where each key is representive of a numeral, the selection of one or more keys being indicative of a particular number. Each number is indicative of an alpha symbol representative of a phonetic verbalized component, using the symbology of the Alphanumeric orthographic process of the present invention. Thus, the superfluous and confusing characterization of the standard English orthographic process is eliminated in the communications apparatus herein. Thus, the selection of the keys on the keyboard complementally serially selects a plurality of numbers to define a string of verbalized components. These verbalized components are serially constructed to form one or more words in a logical manner.

In one embodiment of the communications apparatus of the present invention, a twelve-key keyboard is utilized and configured similar to a standard telephone touch-tone keypad. In this embodiment, twelve keys are utilized in which the numerals "0" through "9" represent ten of the keys, with the two remaining keys being indicative of a numeral first position and a spacer key. Using the first position key, the "0" through "9" keys can be selected for designating a multi-digit number. In this embodiment, multi-digit numbers are selected which designate alpha symbols representative of verbalized components of the alphanumeric orthographic process of the present invention.

In another embodiment, a "Cain" keyboard is adapted to present on each key a numeric representation and the corresponding alpha symbol for the intended verbalized component. Thus, in this embodiment a selection of a particular key will either transmit the numeric representation or the alpha symbol representative of the particular verbalized component.

Another embodiment is adapted to the "Arm" type keyboard in which only the alpha symbol representative of a particular verbalized component is displayed on a particular key. Although this embodiment is primarily intended for direct transmittal of the alpha symbol representative of the verbalized component, it will be appreciated that the numeric representation of the particular alpha representation can be transmitted as well. Of course, further keyboard designs are possible which utilize either the numeric and/or alpha symbol representations of the verbalized components of the Alphanumeric orthographic process of the present invention.

BRIEF DESCRIPTION OF THE DRAWINGS

FIG. 1 illustrates a twelve-key, "Alexander" keypad in accordance with the present invention;

FIG. 2 depicts a "Cain" type keyboard in which both the numeric and alpha symbol representation of the verbalized components are inscribed on the keys; and FIG. 3 is an "Arm" type keyboard in which only the alpha symbol representations of the verbalized components are inscribed on the keys.

DESCRIPTION OF THE PREFERRED EMBODIMENTS

Turning now to the drawings, FIGS. 1–3 depict the embodiments of the communications apparatus of the present invention. The Alexander keypad of FIG. 1 is broadly designated by the numeral 100. The Cain keyboard of FIG. 2 is designated 200, while the Arm keyboard of FIG. 3 is designated by the numeral 300. The Alphanumeric othographic communication process of the present invention is the underlying basis for the operation of all three keyboards, and must be properly understood to appreciate the function of the keyboards, 100, 200 and 300.

The Alphanumeric orthographic process of the present invention is based on a logical representation of the verbalized components used in the English language. These representations take the form of numeric and alpha symbol representations for the discrete verbalized components. These representations are strategically selected and are placed serially in a fashion to correspond to the order of the verbalized phonetic components of a particular word. This is in contrast to the standard orthographic process where alphabetic character representations of verbalized phonetic components are not strategically selected, and placed in a serial fashion and often presents inadequate representation or superfluous representation.

Thus, a "verbalized component" may comprise one or more letters in standard English. As used herein, the term "verbalized component" means a discrete portion of a word which is capable of verbal expression in the context of the word. It is not necessary that the discrete component actually be verbalized—indeed, the present invention contemplates non-verbal electronic communication—it being sufficient that the component presents an independent discrete sound if verbalized.

The following table identifies the representation of the discrete phonetic verbalized components used by the Alphanumeric orthographic process of the present invention. For each discrete verbalized component, both a numeric and alpha symbol representation are provided.

TABLE 1

| Number | Alpha Symbol | Oral Components Predominently Used | Category | Classification |
|---|---|---|---|---|
| 1. | Y | Tongue | Restricted Throat | Vowel |
| 2. | I | Tongue | Restricted Throat | Vowel |
| 3. | E | Tongue | Restricted Throat | Vowel |
| 4. | A | Tongue | Restricted Throat | Vowel |
| 5. | θ | Tongue | Restricted Throat | Vowel |
| 6. | O | Tongue | Unrestricted Throat | Vowel |
| 7. | U | Tongue | Unrestricted Throat | Vowel |
| 8. | W | Tongue | Unrestricted Throat | Vowel |
| 9. | L | Upper Incisor Alveolar, Tongue | Alveolar | Consonant |
| 10. | R | Upper Molar Alveolar, Tongue | Alveolar | Consonant |
| 11. | M | Bilabial | Nasal | Consonant |
| 12. | N | Upper Alveolar, Tongue | Nasal | Consonant |
| 13. | Ñ | Tongue, Glottis | Nasal | Consonant |
| 14. | G | Tongue, Glottis | Plosive | Consonant |
| 15. | K | Tongue, Glottis | Plosive | Consonant |
| 16. | D | Upper Incisor, Tongue | Plosive | Consonant |
| 17. | T | Upper Incisor, Tongue | Plosive | Consonant |
| 18. | B | Bilabial | Plosive | Consonant |
| 19. | P | Bilabial | Plosive | Consonant |
| 20. | V | Upper Incisor, Lower Lip | Fricative | Consonant |
| 21. | F | Upper Incisor, Lower Lip | Fricative | Consonant |
| 22. | h̄ | Upper Incisor, Tongue | Fricative | Consonant |
| 23. | h̿ | Upper Incisor, Tongue | Fricative | Consonant |
| 24. | Z | Bi-Incisor | Sibilant | Consonant |
| 25. | S | Bi-Incisor | Sibilant | Consonant |
| 26. | J | Bi-Molar | Sibilant | Consonant |
| 27. | S | Bi-Molar | Sibilant | Consonant |
| 28. | H | Throat | Aspirate | Consonant |
| 29. | W̄ | Bilabial | Aspirate | Consonant |
| 30. | | | | |

Pronunciation

The table suggests the verbalized phonetic component corresponding to the numeric and alpha symbol representations. In the table, "Y" is the alpha symbol representation for the standard English pronunciation "e". To produce the sound characterized by "Y", the mandible is slightly dropped, the lips are open, the tip of the tongue contacts the lower incisor alveolars, the side of the tongue are in contact with the upper molers, the back of the tongue is raised to the maximum, and the center of the tongue is raised from back to front, allowing the vocalized expiring breath to escape from the mouth.

The alpha symbol "I" is the Alphanumeric orthographic process representation for the standard English pronunciation "i". To vocalize this verbalized component—the mandible is slightly dropped, the lips are opened, the tip of the tongue contacts the lower incisor alveolars, the back of the tongue is slightly raised, and the center of the tongue is depressed from back to front, allowing the vocalized, expiring breath to escape from the mouth.

In the table, the "E" is the representation for the standard English verbalized component, "e". To produce this sound—the mandible is slightly dropped, the lips are open, the tip of the tongue is in the normal position, and the sides of the tongue are in the normal position to allow the vocalized expiring breath to escape through the mouth.

The "A" is the alpha numeric orthographic process representation equivalent to the standard English pronunciation "a". This verbalized component is produced by—slightly dropping the mandible, opening the lips, placing the tip of the tongue in the normal position and with the center and back of the tongue is slightly depressed, allowing the vocalized expiring breath to escape through the mouth.

In the table, the "θ" does not correspond to a particular representation in the standard English orthographic system. To produce the verbalized component represented by "θ"—the mandible was slightly dropped, the lips are open, the tip of the tongue contacts the lower incisor alveolars, the back of the tongue is raised to the maximum, and the center of the tongue is depressed from back to front, to allow the vocalized expiring breath to escape from the mouth.

The "O" is the representation corresponding to the standard English pronunciation "ŏ". To produce this verbalized component—the mandible was slightly dropped, the lips are open, the tip of the tongue is in the normal position, and the center and back of the tongue is moderately depressed, allowing the vocalized, expiring breath to escape through the mouth.

In the table, "U" is the alpha numeric orthographic process equivalent to the verbalized component represented in standard English by "ū". To produce this verbalized component—the mandible is slightly dropped, the lips are open, the tip of the tongue is in the normal position, and the center and back of the tongue is depressed to the maximum, allowing the vocalized, expiring breath to escape through the mouth.

"W" is representative of the verbalized component which is equivalent to the standard English pronunciation "ōō" (as in "food"). To produce the sound represented by "W"—the mandible is slightly dropped, the lips are purshed, the tip of the tongue is in the normal position, and the center and back of the tongue is depressed to the maximum, allowing the vocalized, expiring breath to escape through the mouth.

In the Alphanumeric orthographic process, the "L" is equivalent to the standard English pronunciation of the letter "L" ("el"). To produce this verbalized component—the mandible is slightly dropped, the lips are open, the tip of the tongue contacts the upper incisor alveolars, and the center and back of the tongue is in the normal position to allow the vocalized expiring air to escape through the mouth.

The "R" is representative of the verbalized component equivalent to the standard English pronunciation of the letter "R" ("or"). The verbalized component represented by "R" is with—the mandible slightly dropped, the lips open, the sides of the tongue in contact with the upper molers, the tip of the tongue relaxed, and the back center of the tongue raised to the maximum to allow the vocalized, expiring breath to escape through the mouth.

The "M" is the alpha numeric orthographic process representation for the verbalized component equivalent to the standard English pronunciation of the letter "M" ("em"). To produce the sound characterized by "M"—the mandible is dropped, the lips are closed, the tongue is in the normal position, and the vocalized, expiring breath resinates throughout the mouth before escaping through the nose.

From the table, the "N" is the equivalent to the standard English pronuncation of the letter "N" ("en"). This verbalized component is produced by—dropping the mandible, opening the lips, contacting the upper incisor alveolars with the tip of the tongue, contacting the surface of the rest of the teeth with the sides of the tongue, placing the back of the tongue in the normal position, and vocalizing the expired breath so as to resinate throughout the mouth before escaping through the nose.

The "N" is representative of a verbalized component having no exact English equivalent. This verbalized component is similar to the "eng" sound as in "sink". To produce this verbalized component—the mandible is dropped, the lips are open, the entire tongue is retracted to block the glottal opening to the mouth, and the vocalized expiring breath resonates as it escapes through the nose.

The "G" is equivalent to the standard English pronunciation of the letter "G" ("jē"). To produce this verbalized component—mandible is dropped, the lips are open, the tip of the tongue is in contact with the lower incisors, the glottis closes the nasal passage, the back of the tongue contacts the soft palate, blocking the oral cavity and the sound is expressed before the tongue releases, in a plosive manner, the vocalized expiring breath escaping through the mouth.

In the table, the "K" is representative of the verbalized component similar to the standard English pronunciation of the letter "K" ("kā"). This verbalized component is produced almost identically to the verbalized component represented by "G" but is unvoiced.

"D" is the alpha numeric orthographic process representation equivalent to the standard English pronunciation of the letter "D" ("dē"). To produce this verbalized component—the mandible is dropped, the lips are open, the tip of the tongue is pressed against the upper incisor alveolars, the glottis closes the nasal passage, and the sound is expressed before the tongue releases, in a plosive manner, the vocalized, expiring breath escaping through the mouth.

In the alpha numeric othographic process, the "T" is a representative of the verbalized component equivalent to the standard English pronunciation of the letter "T" ("tē"). This sound is formulated almost exactly the same as the verbalized component represented by "D" but is unvoiced.

The "B" is a representation for the verbalized component equivalent to the standard English pronunciation of the letter "B" ("bē"). This sound is produced by—dropping the mandible, closing the lips, placing the tongue in the natural position, and expressing the sound before the lips release in a plosive manner with the vocalized expiring breath escaping through the mouth.

In the table "P" is the alpha numeric equivalent to the standard English pronunciation of the letter "P" ("pē"). The verbalized component represented by "P" is produced identically to the verbalized component represented by "B" but is unvoiced.

In the alpha numeric orthographic process, the "V" is representative of the verbalized component similar to the standard English pronunciation of the letter "V" ("vē"). To produce this sound—the mandible is dropped, the lips are open, the upper incisors rest on the lower lip, the tongue is in the normal position, and the sound is expressed as the vocalized expiring breath is forced around and under the upper incisors, to escape to the mouth.

The "F" in the table is representative of the verbalized component equivalent to the standard English pronunciation of the letter "F" ("ĕf"). The verbalized component representative by "F" is produced similar to the "V" pronunciation, but is unvoiced.

The "h̄" is the Alphanumeric othographic process equivalent to the standard English pronunciation "th" (voiced). To produce the sound represented by "h̄"—the mandible is dropped, the lips are open, the tip of the tongue rests on the edge of the upper incisors, and the sound is expressed as the vocalized, expiring breath is forced around and under the upper incisors to escape through the mouth.

The "ħ" is the Alphanumeric equivalent to the standard English pronunciation "th" (unvoiced). The verbalized component represented by "ħ" is formulated exactly the same as "h̄" but is unvoiced.

In the Alphanumeric orthographic system process of the present invention, "Z" is equivalent to the standard English pronunciation of the letter "Z" ("zē"). To produce the verbalized component represented by "Z"—the mandible is closed at the incisors, the lips are open, the tip of the tongue contacts the lower incisor alveolars, and the sound is expressed as the vocalized, expiring breath is forced between and around the incisors to escape through the mouth.

"S" is the representation for the verbalized component phonetic component equivalent to the standard English pronunciation of the letter "S" ("es"). The sound represented by "S" is produced similar to the verbalized component represented by "Z" but is unvoiced.

"J" is representative of a verbalized component having no specific equivalent expression in standard English pronunciation. This verbalized component is often referred to as "zh" sound. It is expressed in standard English by various letters, including "s" (as in pleasure), "z" (as in azure), and "g" (as in mirage). To produce the sound represented by "J"—the mandible is closed at the molars, the lips are open, the tip of the tongue is retracted slightly, and the sound is expressed as the vocalized, expiring breath is forced between and around the incisors to escape through the mouth.

The "S" representation in the Alphanumeric orthographic process is equivalent to the standard English pronunciation of the letters "sh". This sound is formulated exactly the same as "J" but is unvoiced.

In the table, "H" is equivalent to the standard English pronunciation of the letter "H" ("eetsh"). The verbalized component represented by "H" is made by—dropping the mandible, opening the lips, placing the tongue in the normal position, and expelling the breath through the unobstructed mouth unvoiced.

"W̄" is equivalent to the standard English pronunciation of the letters "wh". This sound is formed by—dropping the mandible, pursing the lips, and placing the tongue in the normal position, with the sound expressed as the unvoiced expiring breath is forced through the pursed lips.

In the Alphanumeric othographic process, the "\" alpha symbol is not representative of a phonetic verbalized component. The "^" is used to separate words.

Operation of the Alphanumeric Orthographic Process

There are three major advantages of the Alphanumeric orthographic process of the present invention over the standard English orthographic process. First, in the orthographic process of the present invention, the characters (numerals and/or alpha symbols) are strategically selected and placed serially. This is in contrast to the standard English orthographic system where the letters are sometimes randomly selected and placed. The serial placement of the representations in the present invention provides for easier recognition of verbalized components.

Secondly, the Alphanumeric orthographic process of the present invention provides that the character representations are confined to singular conformation. This eliminates the confusion perpetuated by dual conformation often found in the standard English orthographic process. Thus, there are no upper and lower case representations in the Alphanumeric orthographic process of the present invention.

Finally, and perhaps most importantly, the Alphanumeric orthographic process of the present invention provides sufficient characters for representation of all the individual verbalized components within the English language. However, the Alphanumeric orthographic process eliminates superfluous alphabetic characters and supplants dual letter representations with single alpha and/or numeric symbols.

For example, the letters "C, Q, X" are superfluous within the standard English orthographic process because these pronunciations repeat those of other letters. The letter "C" will usurp either the sound of the English equivalent "k" or English "s" depending upon the letter immediately succeeding it. For example, the "C" might be used in "cake, coat, cute" or a different sound as in "cent, cite, or cycle".

The letter "Q" is also superfluous because it possesses no independent pronunciation. "Q" is always followed by the letter "u" in the standard English orthographic process and usually usurps the sounds of the letters "k" or "w". Examples include "quick, queen, equal". However, in some words "Q" is pronounced as a hard "k" (without the "W" sound) as in "conquer, croquet." Finally, "Q" is often combined as in "que" to produce the sound as in "antique" or "unique".

The letter "X" is also superfluous because it possesses no independent pronunciation. "X" usurps the sound of the combined letters in standard English "ks" as in "mix" or "next". In some words—"exact, example'—the "X" sound is pronounced as the English equivalent "gz".

"X" is also pronounced as "ksh" as in "noxious". In other words, such as luxurious," the "x" sound is pronounced as "gzh." If "x" is in the initial position, it is pronounced as "z" as in "xylophone". A major inefficiency in the standard English orthographic system is the use of digraphs to represent verbalized phonetic verbalized components for which there are no single letter representatives. For example, standard English words use the diagraphs "ch", "sh", "th", and "wh". The Alphanumeric orthographic system process of the present invention replaces these digraphs with a single alpha and/or numeric symbol representative, thus adhering to symbolic logic and avoiding inefficiencies and inconsistencies.

EXAMPLE

An example is useful in comparing the efficiency of the alpha numeric orthographic process of the present invention with the standard Englich orthographic system.

In standard English the following paragraph has 177 letters:

> Standard orthography no longer effects the level of literacy necessary for our advanced society. In order to eliminate illiteracy, we must first recognize the shortcomings of the standard orthographic process.

In the Alphanumeric orthographic process of the present invention, the above paragraph reads as follows:

> STANDRD UWR͞hOGRUFY NUW LONGR IFEKTS ͞hU LEVL UV LITRUSY NESUSERY FUWR AWR ADVANST SUWSθYUTY. IN UWRDR TW YLIMUNEYT ILITRUSY, WY MUST FRST REKUGNθYZ ͞hU SUWRTKUMINS UV ͞hU STANDRD UWR͞hUWGRAFIK PROSES.

The number representation for the above recited paragraph would appears as follows:

$$2_5 1_7 4_1 2_1 6_1 0_1 6 \backslash 7_8 1_0 2_3 6_1 4_1 0_7 2_1 1 \backslash 1_2 7_8 \backslash 9_6 1_3 1_4 1_0 \backslash 2_2 1_3 1_5 1_7 2_5 \backslash 2_2 7 \backslash$$
$$9_3 2_0 9 \backslash 7_2 0 \backslash 9_2 1_7 1_0 7_2 5_1 \backslash 1_2 3_2 5_7 2_5 3_1 0_1 \backslash 2_1 7_8 1_0 \backslash 4_8 1_0 \backslash 4_1 6_2 0_4 1_2 2_5 1_7 \backslash$$
$$2_5 7_8 2_5 5_1 7_1 7_1 \backslash\backslash 2_1 2 \backslash 7_8 1_0 1_6 1_0 \backslash 1_7 8 \backslash 1_9 2_1 1_7 1_2 3_1 1_7 \backslash 2_9 2_1 7_1 0_7 2_5 1 \backslash 8_1 \backslash$$
$$1_1 1_7 2_5 1_7 \backslash 2_1 1_0 2_5 1_7 \backslash 1_0 3_1 5_7 1_4 1_2 5_1 2_4 \backslash 2_2 7 \backslash 2_7 7_8 1_0 1_7 1_5 7_1 1_2 1_3 2_5 \backslash 7_2 0 \backslash 2_2 7 \backslash$$
$$2_5 1_7 4_1 2_1 6_1 0_1 6 \backslash 7_8 1_0 2_3 7_8 1_4 1_0 4_2 1_2 1_5 \backslash\backslash 1_9 1_0 6_2 5_3 2_5$$

A comparison of the above illustrates that in the standard English orthographic system, 177 letters are used. In the Alphanumeric orthographic process, 164 alpha symbols are used or 164 numbers.

Operation of the Keyboards

Operation of the keyboards illustrated in FIGS. 2 and 3 are fairly self-explanatory once the alpha symbols and the numeric representation of the present invention are understood. For example, to produce the verbalized component corresponding to the standard English pronunciation "ē" the "Y" alpha symbol is selected. In the Cain keyboard 200 (FIG. 2), the corresponding key is imprinted with the numeral 1 and the alpha symbol "Y". In the Arm keyboard 300 (FIG. 3), the corresponding key is only imprinted with the alpha symbol "Y".

FIG. 1 depicts the Alexander keypad 100. The keypad 100 is similar to the standard 12 key touch-tone telephone keypad. For clarity, the "*" key on the standary touch-tone keypad as imprinted "UPR", while the "#" key on a standard touch-tone is imprinted "\".

To transmit the message utilized in Example 1, the user would select the appropriate keys on the keypad 100. The first word in standard English is "Standard" and has the Alphanumeric equivalant of "STANDRD". The Alphanumeric orthographic process corresponding number standard is $$\begin{matrix} 2 & 1 & 1 & 1 & 1 \\ " & & & & ." \\ 5 & 74 & 2 & 6 & 0 & 6 \end{matrix}$$

The first alpha symbol "S" is selected by depressing the "UPR" key on keypad 100 followed by the "2" key. Next, the user simply presses the "5" key; it being unnecessary to designate the "prime" position as the system of the preferred embodiment defaults to recognize depression of a number key as the prime digit of a numeral. To formulate the alpha symbol "T" the "UPR" key is depressed, followed by the "1" key, and then the "7" key is depressed. The alpha symbol "A" is formulated by simply depressing the "4" key, the system recognizing a default to the prime digit in the numeral unless the "UPR" is depressed.

The preferred embodiment contemplates that the selection of the keys on the keypads 100, 200, 300 is output directly to a printer. Thus, the means for outputting the message comprises both the printer of the operable connection between the keypad and printer. An alternate embodiment contemplates that the mechanism for outputting the message comprises the read/write head assembly in an electronic storage device (e.g. floppy disk assembly in a personal computer) and the electronic interface connected to the keypad.

Although there are many different alternatives which will be readily apparent to one skilled in the art for reformulating and modifying the Alphanumeric orthographic system process of the present invention, the preferred embodiment illustrates the advantages of the present invention over standard English orthography. Further, the keyboard design utilizing the Alphanumeric orthographic process promises to be an efficient method of transmitting a verbalizable message, particularly in a digitalized telecommunications media.

What is claimed is:

1. A communication apparatus comprising:
   a keyboard having a pluarality of keys represented by the numerals "0" through "9", and including means for designating the position of a particular numeral if a multi-digit number is intended, the selection of one or more keys being indicative of a particular number,
   each number being indicative of a verbalized component of a language in which at least some of the verbalized components comprise two or more aliphabetic characters representative of the verbalized component, and
   means for outputting a serial string of numbers indicative of a corresponding serial string of verbalized components formative of one or more words in said language, said outputting means being operable upon selection of keys on said keyboard.

2. The apparatus according to claim 1, said designating means comprising a first position key which is selectable for indicating that the selection of a numeral key is intended to occupy a first position in a two digit number.

3. The apparatus according to claim 1, a separation key which is selectable for indicating separation between discrete words.

4. A keyboard for communicating a substantially non-numeric message comprising:
   ten selectable numeral key means respectively corresponding to the numerals "0+ through "9";
   position key means for designating when the numeral input by the selection of a particular numeral key is for use as the first digit in a multi-digit number;
   means for determining when the numeral input by the selection of a particular numeral key is for use as the prime digit in a number,
   said message comprising a plurality of verbalized components at least some of which comprise two or more aliphatic characters,
   each verbalized component of the message being represented by a single number input by the selection of one or more of said key means.

5. The keyboard according to claim 4, said position key means being operable to designate that a numeral key means selected after said operation of said position key means comprises the first digit in a two digit number.

6. The keyboard according to claim 4, said position key means being operable to designate that a numeral key means selected before said operation of said position key means comprises the first digit in a two digit number.

7. The keyboard according to claim 4, wherein said single numbers correspond generally to the following vocabulary:

| Number | Letter Voiced |
|---|---|
| 1 | Y |
| 2 | I |
| 3 | E |
| 4 | A |
| 5 | θ |
| 6 | O |
| 7 | U |
| 8 | W |
| 9 | L |
| 10 | R |
| 11 | M |
| 12 | N |
| 13 | N |
| 14 | G |
| 15 | K |
| 16 | D |
| 17 | T |
| 18 | B |
| 19 | P |
| 20 | V |
| 21 | F |
| 22 | T̄h |
| 23 | t̄h |
| 24 | Z |
| 25 | S |
| 26 | J |
| 27 | S |
| 28 | H |
| 29 | W. |

8. The keyboard according to claim 4, wherein said muti-digit numbers correspond generally to, the following English phonetics:

| Number | Phonetic |
|---|---|
| 1 | ē |
| 2 | i |
| 3 | ĕ |
| 4 | ā |
| 6 | ō |
| 7 | ŭ |
| 8 | o͞o |
| 9 | ĕl |
| 10 | ŏr |
| 11 | ĕm |
| 12 | ĕn |
| 13 | ĕng |
| 14 | jē |
| 15 | kā |
| 16 | dē |
| 17 | tē |
| 18 | bē |
| 19 | pē |
| 20 | vē |
| 21 | ĕf |
| 22 | th (voiced) |
| 23 | th (unvoiced) |
| 24 | zē |
| 25 | ēs |
| 27 | sh |
| 28 | ēetsh |
| 29 | wh |

9. A process for communicating comprising the steps of:
establishing a single alpha symbol for each verbalized component of a language in which at least some of the verbalized components comprise two or more alphabetic characters representative of the verbalized component;
matching each discrete verbalized component in a word with a single alpha symbol; and
serially arranging the single alpha symbols according to the order of the pronunciation of the verbalized components of said word to present a word comprising a pluarlity of alpha symbols each single alpha symbol being representative of a single, discrete, verbalized component.

10. The process according to claim 9, including the steps of:
matching each alpha symbol with a number representative of the corresponding verbalized component; and
serially arranging the numbers according to the order of the pronunciation of the verbalized components of said word.

11. The process according to claim 10, wherein the lineally arranged numbers of a word are serially disposed with the two digit numbers differentiated from the single digit numbers by offsetting one of the digits of the two digit numbers.

12. The process according to claim 11, wherein the first digit of a two digit number is raised as to superscript to the prime digit of said two digit number.

13. The process according to claim 11, including the step of separating individual words with a separation symbol.

14. The process according to claim 13, wherein the separation symbol comprises a slash ( ).

15. The process according to claim 9, wherein the language is English and the standard English verbalized component "ē" corresponds to the alpha symbol "Y".

16. The process according to claim 9, wherein the language is English and the standard English verbalized component "ī" corresponds to the alpha symbol "I".

17. The process according to claim 9, wherein the language is English and the standard English verbalized component "ĕ" corresponds to the alpha symbol "E".

18. The process according to claim 9, wherein the language is English and the standard English verbalized component "ā" corresponds to the alpha symbol "A".

19. The process according to claim 9, wherein the language is English and the standard English verbalized component "ĕl" corresponds to the alpha symbol "L".

20. The process according to claim 9, wherein the language is English and the standard English verbalized component "ŏr" corresponds to the alpha symbol "R".

21. The process according to claim 9, wherein the language is English and the standard English verbalized component "w̄h" corresponds to the alpha symbol "W".

22. The process according to claim 9, wherein the language is English and the standard English verbalized component "sh" corresponds to the alpha symbol "S".

23. A communication apparatus comprising:
a keyboard having a pluarlity of keys, each key being represented by an alpha symbol,
each single alpha symbol being indicative of a single, discrete, verbalized component of the English language in which many of the verbalized components are represented by two or more aliphabetic characters, and means for outputting a serial string of alpha symbols indicative of a corresponding string of verbalized components, such that a word in English is output upon selection of the keys, with the alpha symbols appearing in the order of the verbalized components of the English word.

24. An apparatus according to claim 23, the alpha symbols comprising a set of less than thirty, the alpha symbol set being representative of the verbalized components of the English language.

25. An apparatus according to claim 24, the outputting means being operable for visually presenting the string of alpha symbols.

* * * * *